(12) United States Patent
Verbos

(10) Patent No.: US 11,596,951 B2
(45) Date of Patent: Mar. 7, 2023

(54) SHAKER TABLE

(71) Applicant: Best Process Solutions, Inc., Brunswick, OH (US)

(72) Inventor: Edward A. Verbos, Hinckley, OH (US)

(73) Assignee: BEST PROCESS SOLUTIONS, INC., Brunswick, OH (US)

( * ) Notice: Subject to any disclaimer, the term of this patent is extended or adjusted under 35 U.S.C. 154(b) by 238 days.

(21) Appl. No.: 17/122,373

(22) Filed: Dec. 15, 2020

(65) Prior Publication Data

US 2022/0184631 A1 Jun. 16, 2022

(51) Int. Cl.
*B03B 4/02* (2006.01)
*B07C 99/00* (2009.01)
*B65B 1/22* (2006.01)

(52) U.S. Cl.
CPC ............... *B03B 4/02* (2013.01); *B07C 99/00* (2022.08); *B65B 1/22* (2013.01)

(58) Field of Classification Search
CPC .. B03B 4/02; B07C 99/00; B65B 1/22; B65G 2201/0285
See application file for complete search history.

(56) References Cited

U.S. PATENT DOCUMENTS

| 3,032,175 A | 5/1962 | Thomas |
| 2008/0192565 A1 | 8/2008 | Johnson et al. |
| 2014/0157729 A1 | 6/2014 | Weinmann et al. |
| 2018/0070595 A1 * | 3/2018 | McCafferty ............... A21B 1/24 |
| 2021/0047136 A1 * | 2/2021 | Strong ................... B65G 69/02 |

FOREIGN PATENT DOCUMENTS

WO 2005110850 A1 11/2005

OTHER PUBLICATIONS

FA-O Flat Deck Low Profile Vibratory Table to Compact Fiber Strands—The Cleveland Vibrator Company; https://www.youtube.com/watch?v=8fuFf1TkK54, online Publication Date Feb. 26, 2020, XP055860505.

web.archive.org: "Shaking Bulk Materials with Compaction Tables", Aug. 24, 2017, XP055860559, Retrieved from the Inernet: URL:https://web.archive.org/web/20170824004912/http://www.shake-it.com/compaction-tables/shaking-of-bulk-material-in-cartons.

* cited by examiner

*Primary Examiner* — Michael McCullough
*Assistant Examiner* — Kalyanavenkateshware Kumar
(74) *Attorney, Agent, or Firm* — Pearne & Gordon LLP

(57) ABSTRACT

A shaker table for settling randomly oriented items in a generally rectangular container with sidewalls prone to bulge at lower portions thereof, including a pan with a generally horizontal bottom for supporting the container and an underlying pallet while being shaken, a power drive for shaking the pan, container, and pallet, and side restraints limiting lateral movement of the container during shaking movement.

3 Claims, 3 Drawing Sheets

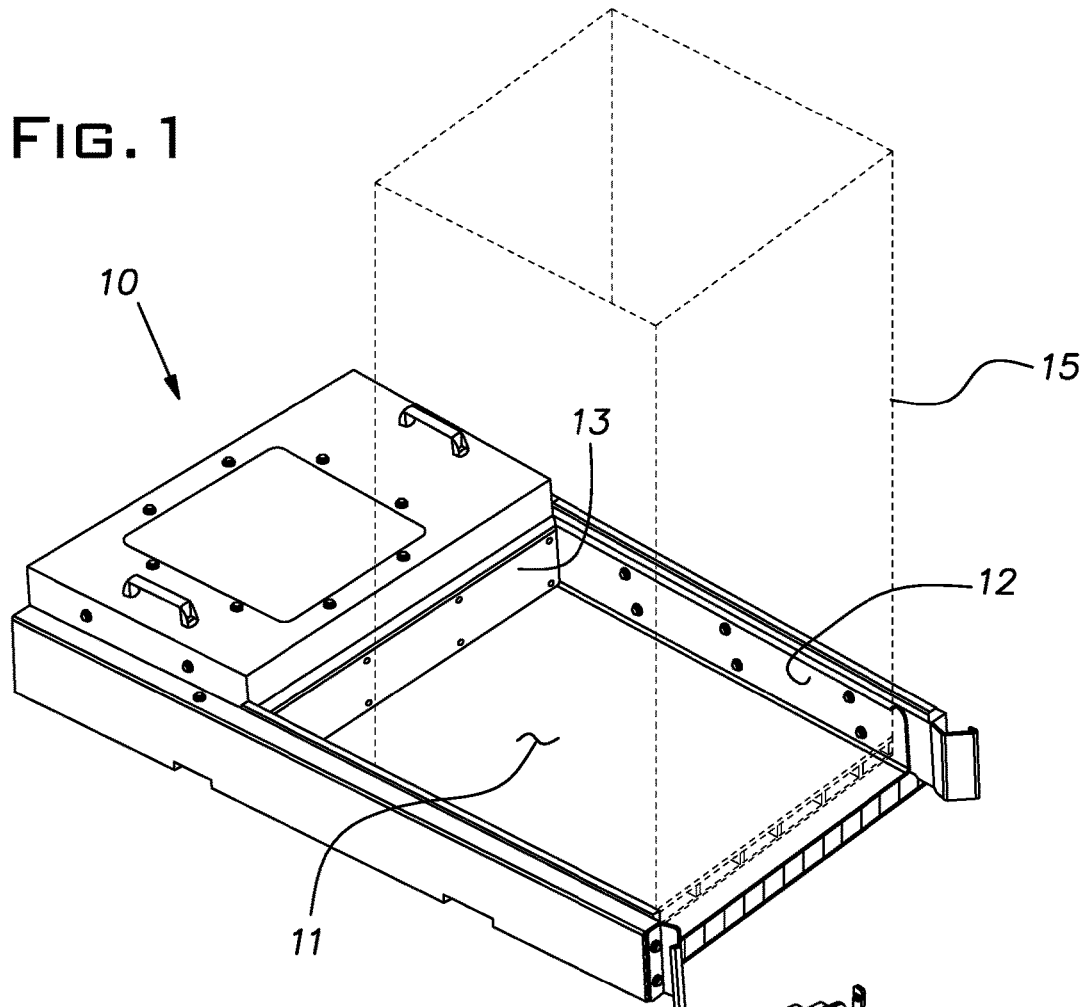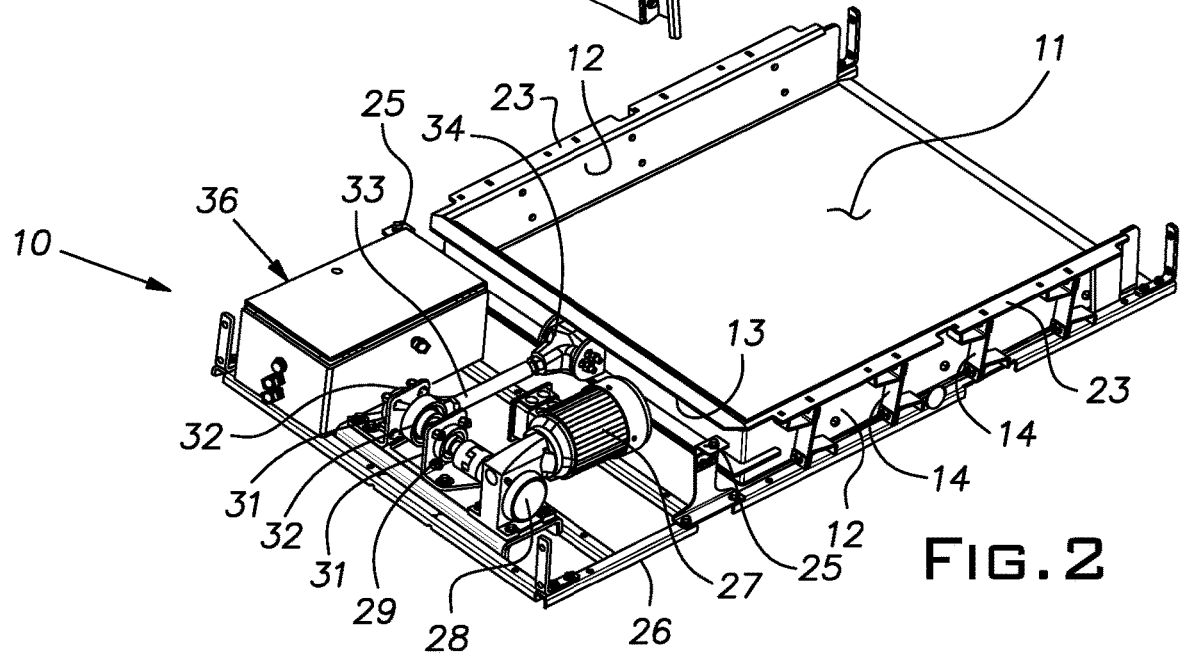

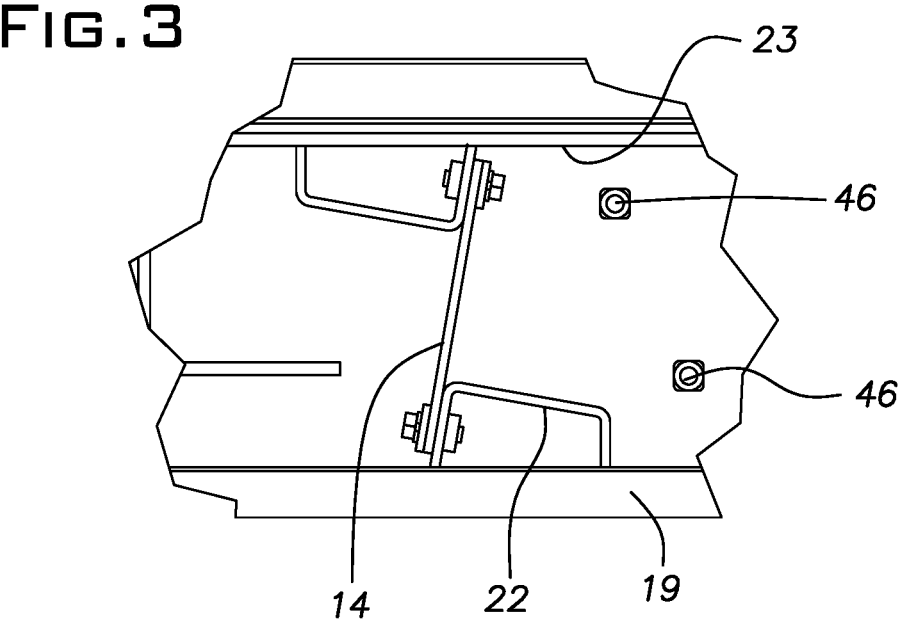
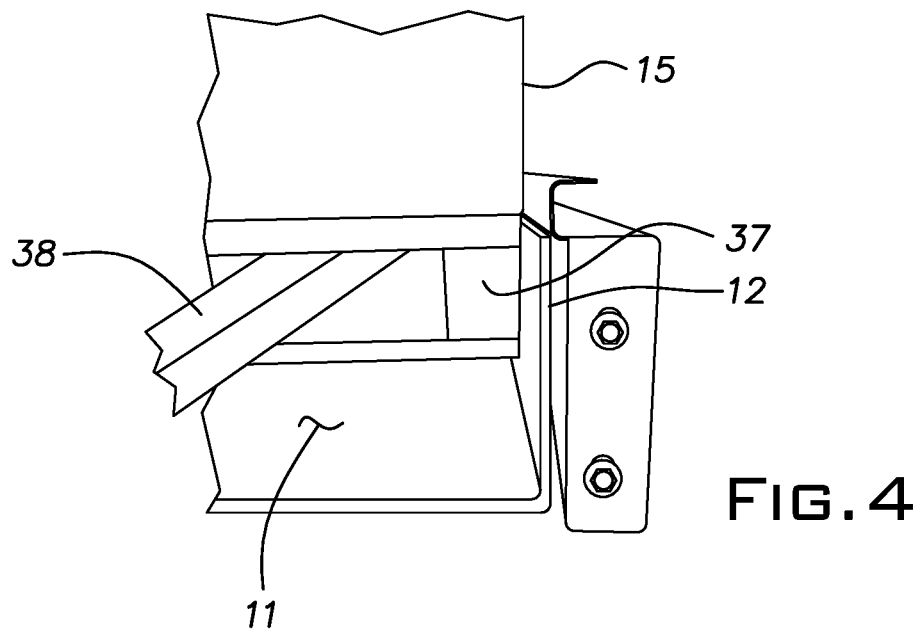

SHAKER TABLE

BACKGROUND OF THE INVENTION

The invention relates to vibratory equipment that reduces the bulk of parcels of various size, shape and rigidity randomly deposited in a shipping container.

PRIOR ART

Earlier developed equipment employed a shaker table or pan that was horizontally oscillated along an axis. Sides of the pan were relatively deep to assure that the container remained properly positioned in the pan while being subjected to vibrational forces. Instances occurred where a package container such as one made of cardboard, sometimes called a gaylord, ballooned out at its sides as the parcels settled in the container. This circumstance was objectionable since it made off-loading of the container difficult especially where the container was moved with a manual pallet jack.

SUMMARY OF THE INVENTION

The invention provides a shaker table or pan apparatus for densifying the bulk of parcels randomly deposited in a container, typically used for shipping, that avoids interference between a ballooned out container and the sides of the pan. The pan sides are sufficiently high to positively fully laterally confine a pallet underlying and supporting the parcel container but low enough to avoid possible local growth of the base of the container. It has been discovered that a container of cardboard or cardboard-like construction can withstand an extensive period of vibration of the pan without shifting on the pallet or without rupturing from internal pressure developed by packages settling in the container when the container is free of close confinement by the sides of the vibratory pan.

The invention enables a vibrated, filled container to be easily removed from the shaker apparatus with a manual pallet jack even with the container sidewalls tending to bulge outwardly.

BRIEF DESCRIPTION OF THE DRAWING

FIG. 1 is a perspective view of the shaker table of the invention loaded with a gaylord, shown in broken line;

FIG. 2 is a perspective view of the shaker table with its covers removed;

FIG. 3 is an enlarged view of a typical suspension leaf spring;

FIG. 4 is a fragmentary elevational view of a gaylord elevated by a pallet jack in a vibrating pan of the table;

DESCRIPTION OF THE PREFERRED EMBODIMENT

Figure 5:
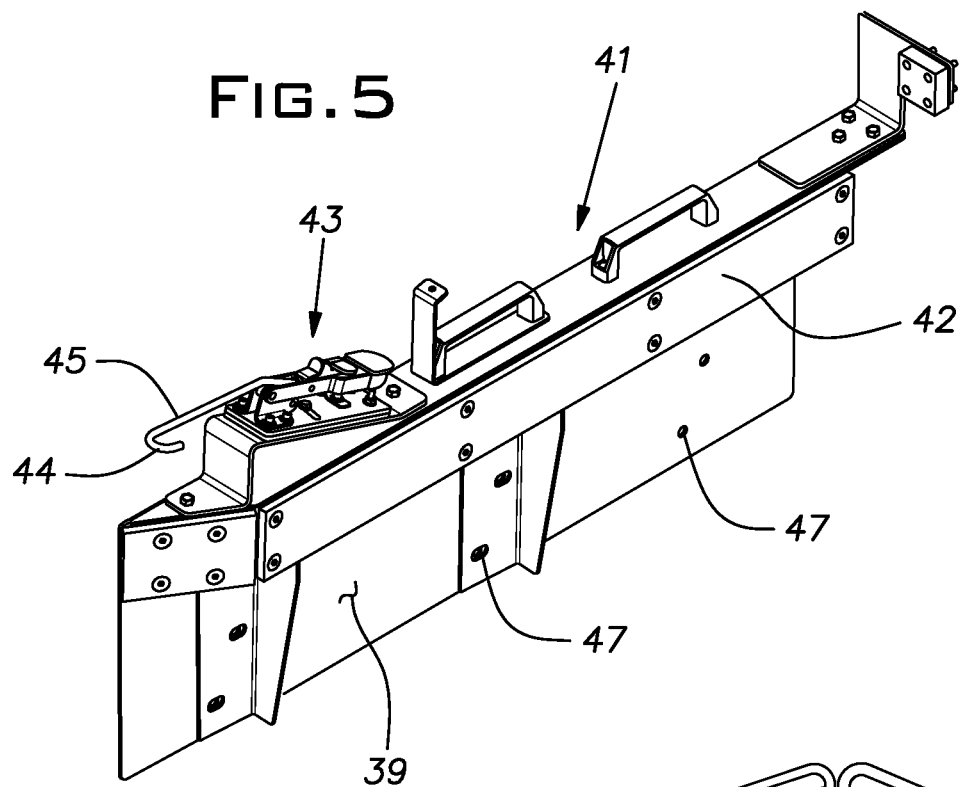
FIG. 5 is a perspective view of a cart adapter assembly.

A vibrating machine or shaker table 10 is depicted in FIG. 1 loaded with a large cardboard container, sometimes called a gaylord in the industry, shown in broken line. The machine 10 is shown in FIG. 2 with its covers removed to show details of its construction.

A vibratory pan 11 with three vertical sides 12, 13, is suspended at opposite sides 12 by a plurality of flat leaf springs 14, preferably made of fiberglass sheets. Lower ends of the spring 14 are clamped to a respective bracket 18 welded to a frame rail 19, preferably of inverted rectangular steel channel stock, at each side 12, 13 of the pan as shown in FIG. 3. Similarly, upper ends of the springs 14 are clamped to respective brackets 22 welded along lower faces of flanges 23 of the pan sides 12. A bottom 21 of the pan at its open side is bent down to near floor level to facilitate loading of wheeled devices into the pan 11 while the main part of the pan bottom 21 is supported above a floor by the springs 14.

Adjacent the pan closed side 13 is a subframe 26 on which is mounted a prime mover in the form of an electric motor 27 and gear reducer 28. An output shaft 29 of the gear reducer 28 is coupled to a shaft 29 carried between bearings 31. The shaft 29, between the bearings 31, has an eccentric portion on which is mounted a rod end 32. A rod 33 on the rod end 32 is connected to a pivotal oscillation mount 34 fixed to the pan side 13. The eccentric on the shaft 29, as it rotates, imparts nearly sinusoidal shaking motion to the pan 11. By way of example, not limitation, the eccentric develops a stroke of about ¾ inch at about 150 to 300 cycles per minute resulting in about 1 G of acceleration. Suitable electrical components for operating the motor are housed in a metal cabinet 36.

The subframe 26, on which the motor 27, gear reducer 28 and related components are mounted, is separable from the main frame rails 19 by disconnecting bolted-on brackets 25 on each side of the machine 10. This feature enables the entire drive unit to be easily and quickly removed and replaced.

Ordinarily, a gaylord 15, filled with randomly oriented parcels, on a wood or plastic pallet 38 is conveyed onto the pan 11 with a manual pallet jack of known construction. The pallet 38 is lowered on the pan bottom 21 and the pallet jack is removed. The gaylord 15 is horizontally confined by the pan sides 12, 13. The tops of the springs 14 are tilted away from the closed pan side 13 at mid-stroke or cycle of pan movement so as to bias objects on the pan 11 towards the closed side 13 during vibration. Additionally, the pan bottom 21 may be tilted towards the closed pan side 13 to bias objects towards the closed side 13.

The pan 11 and gaylord 15 are vibrated while the gaylord is receiving the parcels in the form of envelopes, bags, boxes, tubes, etc. The randomly oriented parcels dropped in the gaylord 15 settle due to the vibration so that additional parcels can be deposited in the gaylord, thereby lowering shipping costs.

It has been discovered that a large rectangular cardboard box or like container such as a gaylord 15 tends to bulge at its bottom from the pressure developed by the weight of the parcels in the container. By limiting the height of the pan or table sides 12 that laterally restrain in accordance with the invention, friction between these elements can be limited so as to enable use of a manual pallet jack. Typically, a gaylord or like container is supported by a conventional pallet 37 in the pan or table 11. Forks 38 of a pallet jack (one is shown in FIG. 4) are used to lift the filled, vibrated container 15 and the pallet to a level where, as shown in FIG. 4, the bottom of the container is close, i.e. preferably not more than 2 inches, and more preferably not more than 1 inch below the top of the pan sides 12. The illustrated pan side 12 is nominally 7 inches high (inside dimension). A dimension of about 7 inches can be increased or decreased by 1½ inches, such as when a conventional pallet jack that lifts to 7½ inches is used.

Figure 6:
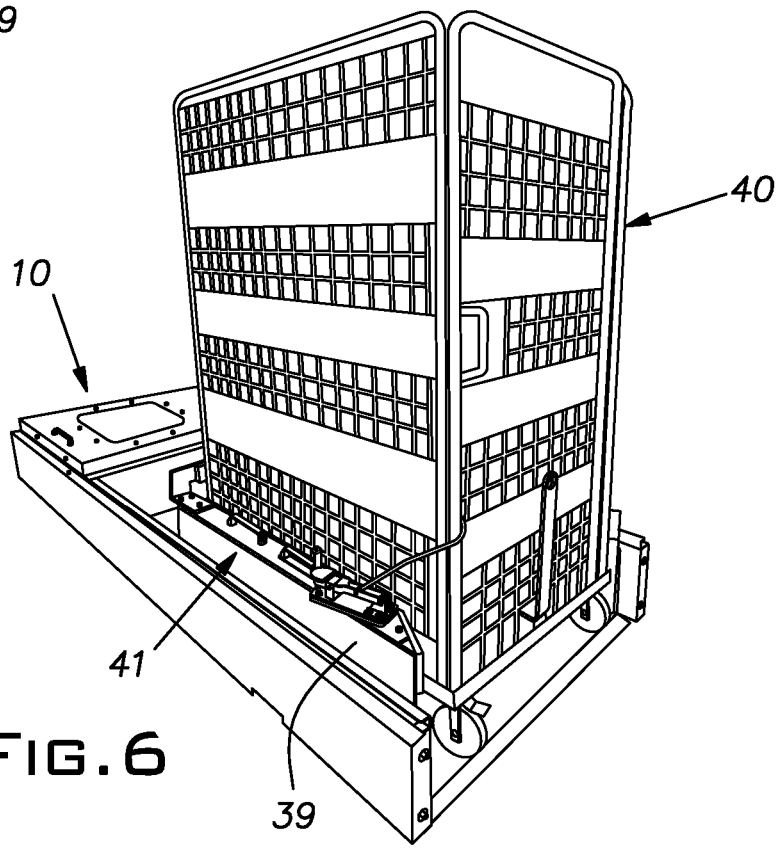
FIG. 6 is a perspective view of a wheeled cart on the shaker table.

As shown in FIG. 6, the shaker table 10 can process wheeled carts having rigid cage-like side walls. The illustrated container cart 40 is narrower than the gaylord container 15 discussed above. Elongated adapter assemblies 41 of L-shaped cross-section, like the left-hand version shown in FIG. 5, are constructed and arranged of steel sheet to be attached to the pan sides 12 such as on bolts assembled through holes 46, 47. Elongated plastic guides 42 of the assemblies 41 project horizontally from a vertical steel base sheet 39 and serve to laterally constrain the cart on the pan 11. The cart 40 can be longitudinally secured on the pan 11 at each side with commercially available over center toggle clamps 43 having a hook 44 at the end of a pivotal rod 45. The clamps 43 can be fixed on the adapters 41.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A shaker table for settling randomly oriented items in a generally rectangular container with sidewalls prone to bulge at lower portions thereof when the container and items are shaken, including
    a pan with a generally horizontal bottom for supporting the container and an underlying pallet while being shaken,
    a power drive for shaking the pan, container, and pallet,
    side restraints limiting lateral movement of the container during shaking movement,
    the side restraints existing above the pan bottom a distance limited to about 7 inches whereby when the container is lifted by a conventional manual pallet jack with the pallet a distance of about 7½ inches above the pan bottom the container is generally free of said side restraints and the container can be removed from the pan without a level of friction between the container and restraints due to bulging of the container so as to enable use of the manual pallet jack to lift the pallet and remove the container from the table.

2. A shaker table as set forth in claim 1, including
    a main frame for supporting the pan for oscillation in a longitudinal direction,
    the power drive being mounted on an auxiliary frame attachable to the main frame.

3. A method of increasing the density of parcels randomly deposited in a container prone to bulge at a base thereof comprising
    shaking the container, parcels, and an underlying pallet at a shaking station in a longitudinal direction,
    limiting the vertical height of side restraints parallel to a shaking direction to about 7 inches so that when the container and parcels are lifted with the pallet with a conventional manual pallet jack, any friction between the container and restraints is limited to enable the pallet jack operated manually by one person to move the pallet and parcel filled container from the shaking station.

* * * * *